(12) United States Patent
Marrec et al.

(10) Patent No.: US 6,707,772 B1
(45) Date of Patent: Mar. 16, 2004

(54) METHOD AND DEVICE FOR DIRECTING AN INCIDENT OPTICAL BEAM TO A TRACK OF INFORMATION ON A DYNAMIC MEDIUM

(75) Inventors: Sonia Marrec, Meylan (FR); Fritz Lebowsky, Corps d'Uriage (FR)

(73) Assignee: STMicroelectronics S.A., Gentilly (FR)

( * ) Notice: Subject to any disclaimer, the term of this patent is extended or adjusted under 35 U.S.C. 154(b) by 692 days.

(21) Appl. No.: 09/586,944

(22) Filed: Jun. 2, 2000

(30) Foreign Application Priority Data

Jun. 28, 1999 (FR) .............................. 99 08239

(51) Int. Cl.$^7$ ................................................ G11B 7/00
(52) U.S. Cl. ..................................................... 369/44.34
(58) Field of Search ............................. 369/44.34, 59.22, 369/124.01, 59.21, 30.23, 44.32, 44.29, 44.26, 44.28

(56) References Cited

U.S. PATENT DOCUMENTS

| | | | |
|---|---|---|---|
| 4,744,069 A | * 5/1988 | Sugiyama et al. | 369/44.29 |
| 5,490,133 A | * 2/1996 | Nakamura et al. | 369/44.23 |
| 5,956,304 A | * 9/1999 | Supino et al. | 369/44.34 |
| 6,614,734 B1 | * 9/2003 | Lebowsky et al. | 369/44.34 |

FOREIGN PATENT DOCUMENTS

| | | | |
|---|---|---|---|
| DE | 32 14951 | 12/1982 | G11B/21/10 |
| EP | 0 883 114 A2 | 12/1998 | G11B/7/09 |

OTHER PUBLICATIONS

Patent Abstracts of Japan vol. 018, No. 293 (P–1747), Jun. 3, 1994 & JP 06 052558 A (Sharp Corp), Feb. 25, 1994 *abrégé*.
Patent Abstracts of Japan vol. 013, No. 001 (P–808), Jan. 6, 1989 & JP 63 211127 A (Seiko Epson Corp), Sep. 2, 1988 *abrégé*.

* cited by examiner

Primary Examiner—Tan Dinh
Assistant Examiner—Kimlien Le
(74) Attorney, Agent, or Firm—Allen, Dyer, Doppelt, Milbrath & Gilchrist, P.A.; Lisa K. Jorgenson

(57) ABSTRACT

The beam reflected by the mobile carrier is picked up by an optical pickup having several photodetectors. The elementary signals respectively delivered by the photodetectors are used to formulate two secondary signals, sampled and filtered by a low-pass filter having a cutoff frequency at most equal to a quarter of the sampling frequency. The mutual phase shift of the two secondary signals is representative of the positioning error TE of the beam with respect to the track. The determination of a value of the mutual phase shift comprises the selecting, for each secondary signal, of at least one pair of samples situated outside a predetermined amplitude range around a predetermined threshold. This makes it possible to tag, respectively for the two secondary signals, two transitions of these secondary signals with respect to the threshold and corresponding to one and the same direction of crossing of the threshold. Also, the two transitions are determined by interpolation from the selected samples, and the time gap between the two transitions is determined.

21 Claims, 8 Drawing Sheets

METHOD AND DEVICE FOR DIRECTING AN INCIDENT OPTICAL BEAM TO A TRACK OF INFORMATION ON A DYNAMIC MEDIUM

FIELD OF THE INVENTION

The invention relates to the directing of an incident optical beam to a track of information on a dynamic medium, and, more particularly, to the control and determination of the positioning error of the incident beam with respect to the track. The invention applies advantageously but not limitingly to digital discs, especially compact discs, e.g. Compact Disc Read Only Memory (CDROM), and most particularly to multifunction digital discs such as the Digital Versatile Disc (DVD) storing image data in a compressed manner, for example.

BACKGROUND OF THE INVENTION

A digital disc includes a single spiral track whose relief is representative of the binary information stored on the track of the disc. The track of the disc is illuminated by an incident optical beam, for example a laser spot, and several photodetectors, for example four, detect the reflection of the light beam on the disc. The optical pickup formed by the photodetectors then delivers four elementary signals delivered respectively by the four photodetectors, as well as an overall signal, or useful signal, equal to the sum of the four elementary signals, and from which the binary information read from the track is extracted.

The directing of the optical beam to the track of the rotating disc is performed exclusively on the basis of the four elementary signals delivered by the photodetectors. In an analog approach: the signals are summed in pairs so as to form two signals which are equalized in an analog equalizer before being shaped, by comparison with a threshold, in two comparators. The two signals thus shaped are mutually phase-shifted if the laser spot is not situated on the track. The phase difference between these two signals is then detected, which phase difference corresponds to the positioning error of the beam with respect to the track. This positioning error is then used conventionally in a servo-control loop to modify the incident optical system and direct the optical beam back to the track.

Generally, an analog approach of this type has the drawback of requiring a considerable number of analog components which results in a larger, bulkier system. Moreover, this number of components is even larger when the useful band of the signals contains high frequencies, thus leading in particular to high consumption. Moreover, as the technology advances, the modification and production of new components of the device require considerable design and production time.

Another known approach includes using a digital approach to sample the signals emanating from the photodetectors before digital processing which includes, e.g., the calculation of the phase shifts. In order to avoid spectral aliasing during sampling, the sampling frequency must be at least twice as high as the maximum frequency of the frequency band of the useful signal containing the information. When the sampling frequency is twice the maximum frequency of the useful band, the number of samples does not make it possible to obtain, through straightforward interpolation between these samples, a correct value of phase shift in the high frequency ranges close to the frequency maximum. The approach includes digitally reconstructing all the signals from the samples. However, this requires digital processing operations which are complex and expensive to implement, e.g. Viterbi decoding processing.

SUMMARY OF THE INVENTION

An object of the invention is avoid the drawbacks of the conventional approaches discussed above. This and other objects are achieved by providing a simple digital solution using straightforward interpolation between samples to calculate the positioning error of the beam with respect to the track of the rotating disc; and, more specifically, when the maximum frequency of the useful band of the information is equal to half the sampling frequency.

Such a configuration occurs in certain applications when the speed of rotation of the dynamic medium is very high, for example 12× (a speed of rotation of 1× corresponding to 4 m/s). Maximum frequencies of around 60 MHz are then obtained. Moreover, with the present semiconductor technologies, for example, 0.25 micron technology, certain components cannot work correctly at frequencies above 120 MHz. The sampling frequency is therefore limited to this frequency.

The invention therefore provides a process for directing an incident optical beam to a track of information on a dynamic medium. According to a general characteristic of the invention, the beam reflected by the medium (for example, the DVD disc) is picked up by an optical pickup comprising several photodetectors (at least two, and preferably four). The elementary signals respectively delivered by the photodetectors are used to formulate two secondary signals, sampled and filtered by a low-pass filter having a cutoff frequency at most equal to a quarter of the sampling frequency. The mutual phase shift between these two sampled and filtered secondary signals is representative of the positioning error of the beam with respect to the track. Moreover, the determination of a value of the mutual phase shift includes the selecting, for each secondary signal, of at least one pair of samples situated outside a predetermined amplitude range around a predetermined threshold (for example the value zero). These two pairs of samples make it possible to tag, respectively for the two secondary signals, two transitions of these secondary signals with respect to the threshold and corresponding to one and the same direction of crossing of the threshold. Additionally, two transitions are determined by interpolation from the selected samples, and the time gap between the two transitions is also determined.

The use of a low-pass filter with a cutoff frequency which is at most equal to a quarter of the sampling frequency makes it possible to obtain a sufficient number of samples to calculate the phase shift by straightforward interpolation. This being so, the low-pass filter eliminates the high frequencies from the frequency spectrum. This therefore results in a theoretical deleting of these frequencies, and in practice, an appreciable local attenuation of the amplitude of the signals. In practice, the sampled and filtered signals are noisy and, by tagging, for each secondary signal, a transition of this signal with respect to a threshold (for example the value zero), using at least one pair of samples situated outside a predetermined amplitude range around this threshold, it is possible to ignore samples whose levels or amplitudes might be situated inside this predetermined range and which if not ignored might lead to erroneous obtainings of transition due to the presence of the noise.

Of course, the person skilled in the art can choose a cutoff frequency for the low-pass filter of lower than a quarter of the sampling frequency. The adjusting of this cutoff frequency of the low-pass filter will be performed by the person skilled in the art as a function of the application and of the accuracy which are desired. In practice, it is preferable to choose a cutoff frequency for the low-pass filter which is not less than a fifth of the maximum frequency of the useful band, i.e. a tenth of the sampling frequency, so as not to eliminate too large a number of samples, which would then lead to a degradation in the accuracy of the phase-shift calculation.

Likewise, the person skilled in the art will be able to adjust the value of the amplitude of the range around the predetermined threshold as a function of the application and in particular of the noise level of the signals. By way of indication, an experimental way of determining the value of the amplitude of the range includes, when calibrating the system, in examining the changes in the phase shift (Positioning error) in open loop. Indeed, the person skilled in the art is aware that by reason of the eccentricity of the disc, the theoretical curve of the phase shift, i.e. of the positioning error, exhibits a sawtooth configuration in open loop. Too small an amplitude value for the range then leads to a very noisy calibration curve which hardly resembles the theoretical curve. Conversely, too high an amplitude value for the range leads to the obtaining of too small a number of values obtained for the positioning error, likewise not making it possible to recover the theoretical curve for the change in positioning error.

It has been observed that it is preferable for the amplitude of the range to be at least equal to the product of the maximum amplitude of the secondary signals times the noise/signal ratio, and likewise preferably less than half the maximum amplitude of the secondary signals.

The invention is based on the observation that when the majority of the information contained in the signals has frequencies situated between the cutoff frequency of the low-pass filter and the sampling frequency, it nevertheless turns out to be possible to circumvent this information when calculating the phase shift, and hence the positioning error, and to use only the information having frequencies below the cutoff frequency of the low-pass filter, to calculate the positioning error. Thus, given the fact that the directing of the beam to the track is performed at low frequency (for example of the order of a few tens of kHz) with respect to the maximum frequency of the signals emanating from the photodetectors, the accuracy obtained according to the invention in calculating the phase shift, by taking into account only some of the samples, is amply compatible with this low-frequency directing. Thus, for a DVD spinning at 12×, 70% of the frequencies lie above 30 MHz and are between 30 and 60 MHz. The invention therefore makes it possible to use only 30% of these frequencies for the calculation of the positioning error.

Thus, the invention makes it possible, in a very simple manner, and by using interpolations, for example linear interpolations, for calculating the transitions, to direct with an accuracy which is entirely compatible with the required demands, an optical beam to a track of a rotating medium of which the signals emanating from the photodetectors contain information at frequencies of up to half the sampling frequency. Of course, the invention would also apply to discs spinning at much lower speeds and for which the frequencies of the useful band would not exceed a quarter of the sampling frequency. The number of selectable samples would then simply be greater.

According to one embodiment of the invention, for each secondary signal, the selected samples allowing the tagging of the transition comprise a pair of samples situated on either side of the predetermined threshold, outside the predetermined range, and respectively forming a local minimum and a local maximum which follow the secondary signal. Moreover, to minimize the errors in selecting, the order of the temporal occurrence of the local minimum and of the local maximum must be the same for the two pairs of samples relating to the two secondary signals. In other words, for a secondary signal, if a local minimum is selected first followed by a local maximum so as to tag a transition of this secondary signal, the selecting of the two local extremes of the other secondary signal will then be valid only if, for this other secondary signal, a local minimum is also tagged first followed by a local maximum.

It would of course be possible, if the sampling frequency is sufficiently high, to use only these two local extremes to calculate each transition of the secondary signal. This being so, it is preferable, with an objective of further increasing the accuracy of calculation of the transition of the secondary signal with respect to the threshold, for the determining of the transition, for each secondary signal, to comprise the storing of the pair of samples respectively forming a local minimum and a local maximum which follow the secondary signal. The intermediate samples situated between these extreme samples may also be stored. Next, the two intermediate samples situated on either side of the predetermined threshold and in the-neighborhood of this threshold are selected from among these intermediate samples. An interpolation is then performed, for example a linear interpolation, between these two selected intermediate samples to obtain a calculated sample whose level corresponds to the threshold. This calculated sample, whose temporal occurrence may readily be determined, then manifests for this secondary signal the transition with respect to the threshold.

The variation using the local extremes for the selecting of the pair of samples situated outside the predetermined amplitude range around the predetermined threshold and making it possible to tag the transition of a secondary signal is merely one possibility of selection. Another possibility for selecting, for each secondary signal, the pair of samples situated outside the predetermined amplitude range around the predetermined threshold, to tag a transition for this secondary signal, is to use the overall signal containing the information and delivered by the pickup. This overall signal, which is in practice the sum of the elementary signals delivered by the photodetectors, has up to now been used only for the extraction of the data. However, it has been observed that the transitions of this overall signal with respect to the threshold are always situated between the two secondary signals and in the middle of them. Thus, this overall signal, and more especially these transitions with respect to the predetermined threshold, can serve as a phase reference. More precisely, by selecting two samples which almost symmetrically flank a transition of the overall signal, one ensures, on the one hand, that these two selected samples indeed belong to the two secondary signals, and, on the other hand, that the calculation of the phase shift on the basis of these two selected samples will lead to a correct estimate of the positioning error.

Thus, the use of this overall signal delivered by the pickup and containing the information might make it possible to select the pair of samples situated outside the predetermined range, and also makes it possible to control the selecting of these samples if they have been, for example, selected by the method of local extremes. Indeed, the two samples calculated by interpolation must then likewise almost symmetrically flank a transition of the overall signal, to within a tolerance.

The subject of the invention is also a device for directing an incident optical beam to a track of information on a dynamic medium. According to a general characteristic of the invention, this device comprises a pickup able to pick up the beam reflected by the mobile carrier and comprising several photodetectors. The device further includes a first processing stage linked to the pickup and comprising sampling means and low-pass filtering means having a cutoff frequency at most equal to a quarter of the sampling frequency. This first stage is able to use the elementary signals respectively delivered by the photodetectors to formulate two secondary signals, sampled and filtered, whose mutual phase shift is representative of the positioning error of the beam with respect to the track.

The directing device also comprises a second processing stage, linked to the output of the first stage, and comprising a selector for selecting, for each secondary signal, at least one pair of samples situated outside a predetermined amplitude range around a predetermined threshold. The selected samples make it possible to tag, respectively for the two secondary signals, two transitions of these secondary signals with respect to the threshold and corresponding to one and the same direction of crossing of the threshold. Also, a formulating device determines the two transitions by interpolation from the selected samples, and a calculation device determines the time gap between the two transitions, to determine a value of the mutual phase shift.

According to one embodiment of the invention, the second processing stage comprises a memory for storing the selected samples for each secondary signal. Moreover, the selected samples allowing the tagging of the transition comprise a pair of samples situated on either side of the predetermined threshold, outside the predetermined range, and respectively form a local minimum and a local maximum which follow the secondary signal. The order of the temporal occurrence of the local minimum and of the local maximum being the same for the two pairs of samples relating to the two secondary signals.

The formulating device is able to store the intermediate samples situated between these extreme samples, for each secondary signal, in the memory. Then, the two intermediate samples situated on either side of the predetermined threshold and in the neighborhood of this threshold, are selected from among these intermediate samples. The formulating device may further comprise an interpolator for interpolating between the two selected intermediate samples of each secondary signal to determine, for each secondary signal, a calculated sample whose level corresponds to the threshold. Finally, the calculation device determines the positioning error from the two calculated samples.

It is moreover particularly advantageous, with the objective of further circumventing the errors due to noise, for the second processing stage to comprise a median filter, for example of length three, linked to the output of the calculation device, and followed by an interpolator filter.

BRIEF DESCRIPTION OF THE DRAWINGS

Other advantages and characteristics of the invention will become apparent when examining the detailed description of modes of implementation and embodiments, which are non-limiting, and of the appended drawings in which.

DETAILED DESCRIPTION OF THE PREFERRED EMBODIMENT

Figure 1:
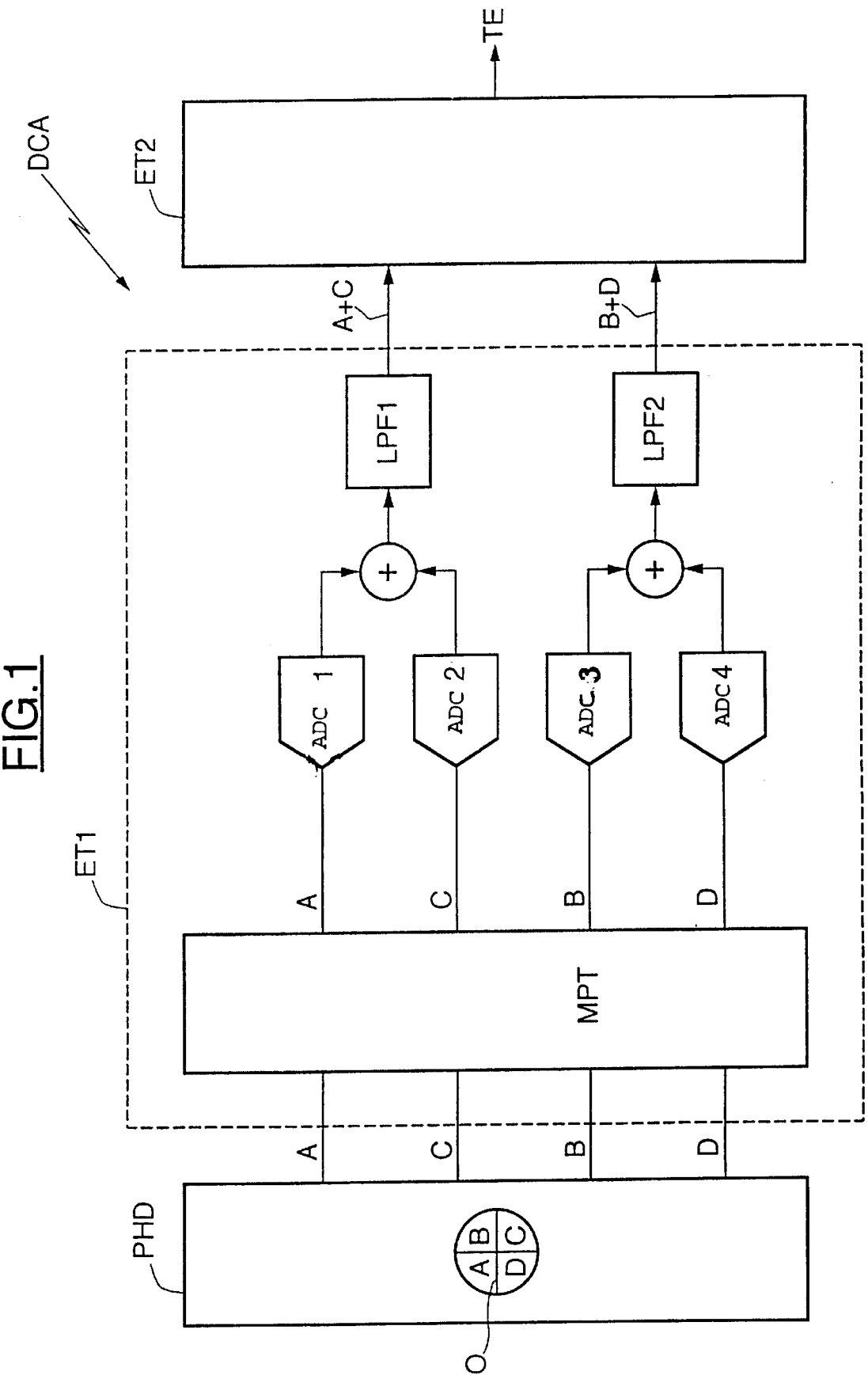
FIG. 1 diagrammatically illustrates the hardware architecture of a first embodiment of a device according to the invention.

In FIG. 1, the reference DCA more particularly designates a directing control device according to the invention, comprising at the front end, a pickup PHD composed of four photodetectors A, B, C, D. In practice, a laser diode emits a laser beam which is directed towards the face of the disc on which the track containing the information is etched, via a beam splitter and a conventional optical system. The beam reflected by the disc then passes through the beam splitter in the opposite direction and is picked up by the four photodetectors A, B, C, D all of which are situated in a plane parallel to the plane of the disc. Each photodetector delivers a signal which has been referenced, for simplifying purposes, by the same letter as that assigned to the photodetector. These elementary signals A, B, C, D are thereafter processed in a first processing stage ET1 comprising preprocessing means MPT which comprise amplifiers as would be appreciated by the skilled artisan.

These signals A, C, B, D delivered by the pre-processing means MPT are thereafter sampled in four analog/digital converters ADC1–ADC4. The sampling clock signal is delivered, for example, by a quartz (not represented here for simplifying purposes). The frequency of the sampling signal is, for example, equal to 120 MHZ. Thereafter, in two adders +, the two elementary signals which are output by the two photodetectors which are symmetric with respect to the center O of the pickup are summed. Thus, one of the secondary signals is equal to the sum of the elementary signals A and C, while the other secondary signal is equal to the sum of the elementary signals B and D.

The summed signals are thereafter filtered respectively in two low-pass filters of identical structure LPF1 and LPF2. The cutoff frequency of these low-pass filters is at most equal to ¼ of the sampling frequency. In the present case, this cutoff frequency is equal to ¼ of the sampling frequency, i.e. 30 MHZ. The processing stage ET1 therefore supplies two sampled and filtered secondary signals, A+C and B+D, whose mutual phase shift is representative of the positioning error of the optical beam with respect to the track of the disc.

Figure 2:
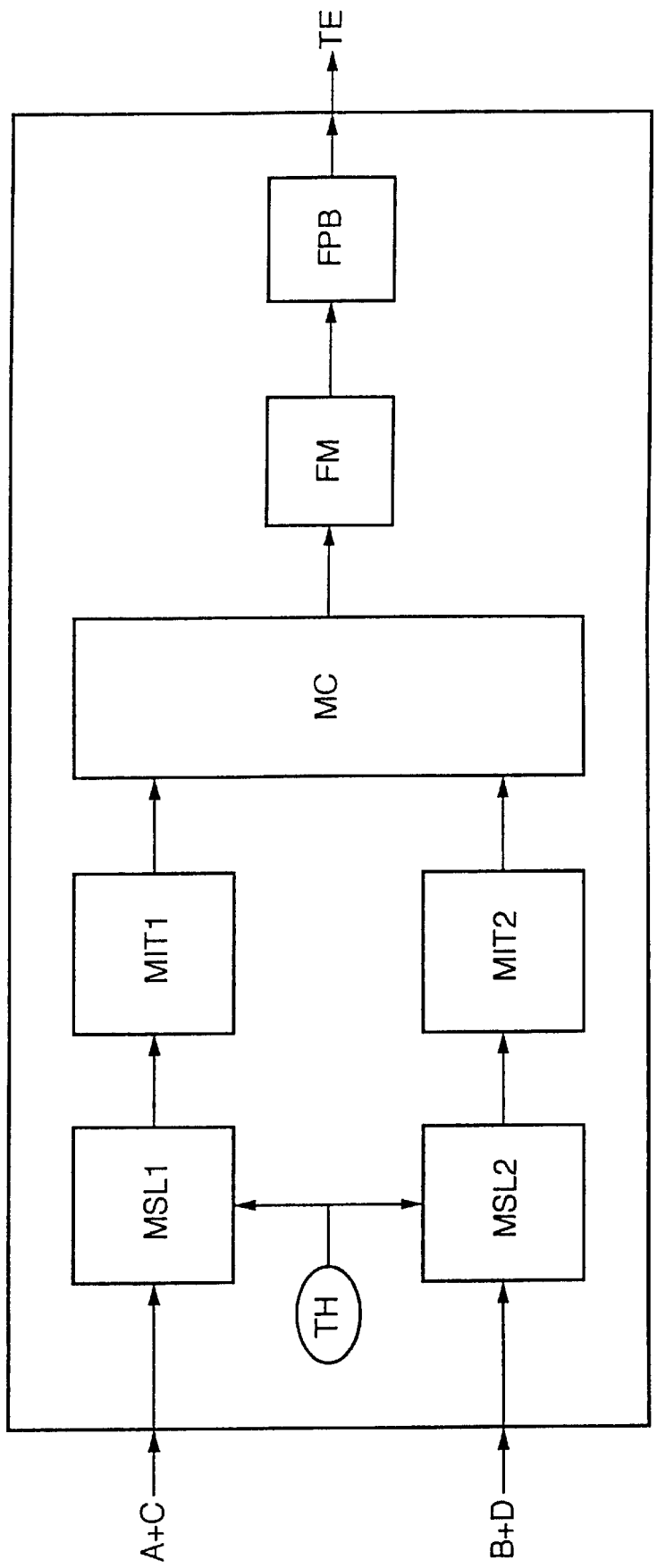
FIG. 2 illustrates in greater detail a part of the device of FIG. 1.

Represented in FIG. 1 are the adders and the filters downstream of the converters. This being so, it would also be possible to sum and to filter the signals upstream of the analog/digital converters. The sampled and filtered secondary signals A+C and B+D, which are also noisy, are delivered to a second processing stage ET2 which will determine the positioning error TE of the beam with respect to the track. The structure of this second processing stage ET2 is now described in greater detail while referring more particularly to FIG. 2.

The second processing stage ET2 includes selection means MSL1 and MSL2 which receive the samples of the signals A+C and B+D, respectively. The stage ET2 moreover comprises interpolation means MIT1 and MIT2 linked to the output of the selection means MSL1 and MSL2. The output of these interpolation means is linked to calculation means MC. Finally, a median filter FM of length three, of a known structure, is linked to the output of the calculation means and is followed by an interpolator filter FPB, typically a low-pass filter. This filter FPB delivers the positioning error TE.

The selection, interpolation and calculation means in particular will now be described functionally. Their embodiment may implemented in software fashion within a controller, for example. For their part, the various filters can likewise be embodied in software fashion or else as specific integrated circuits.

Figure 3:
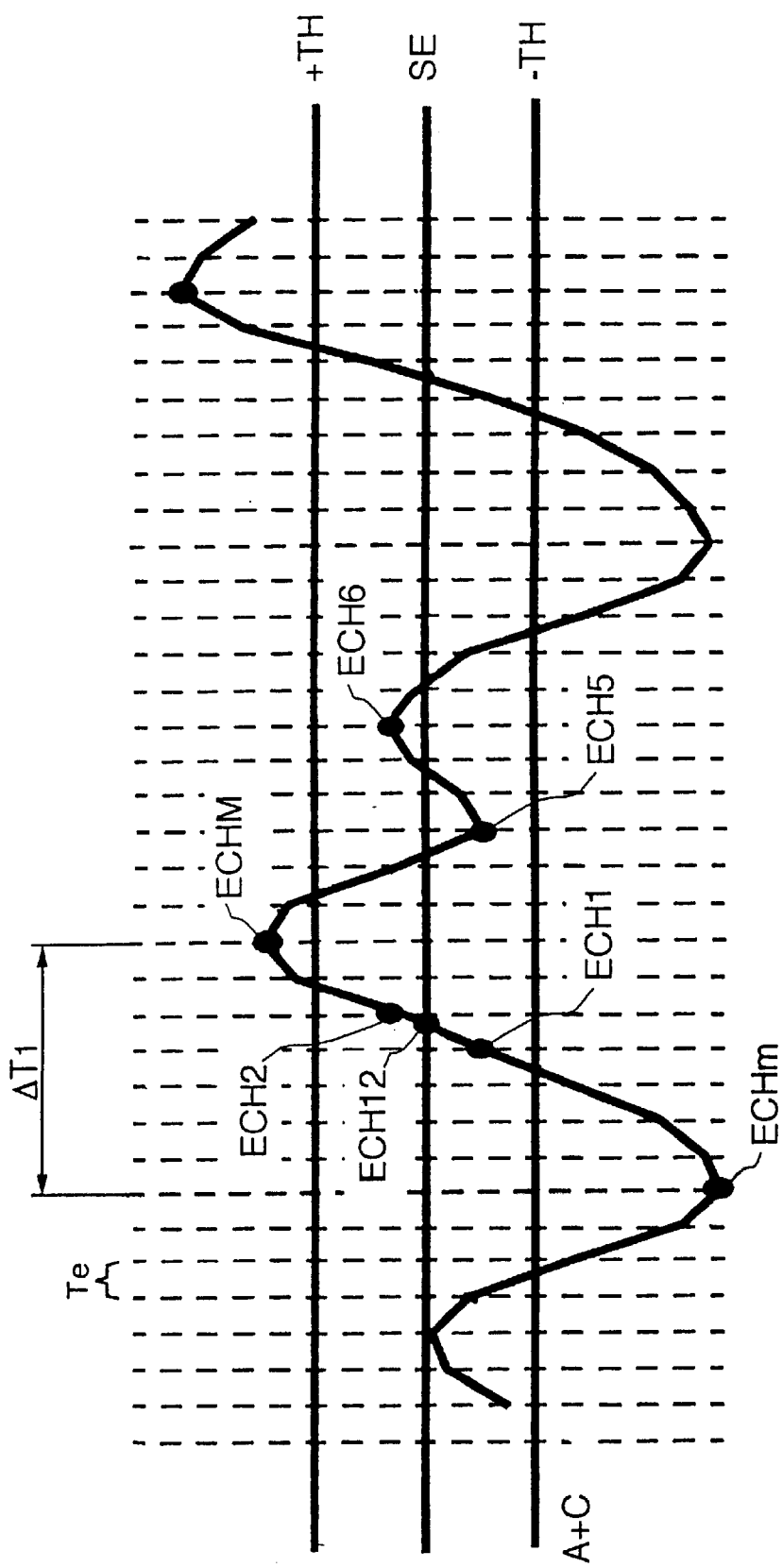
FIG. 3 diagrammatically illustrates the temporal changes in a secondary signal allowing implementation of the process according to the invention.
Figure 4:
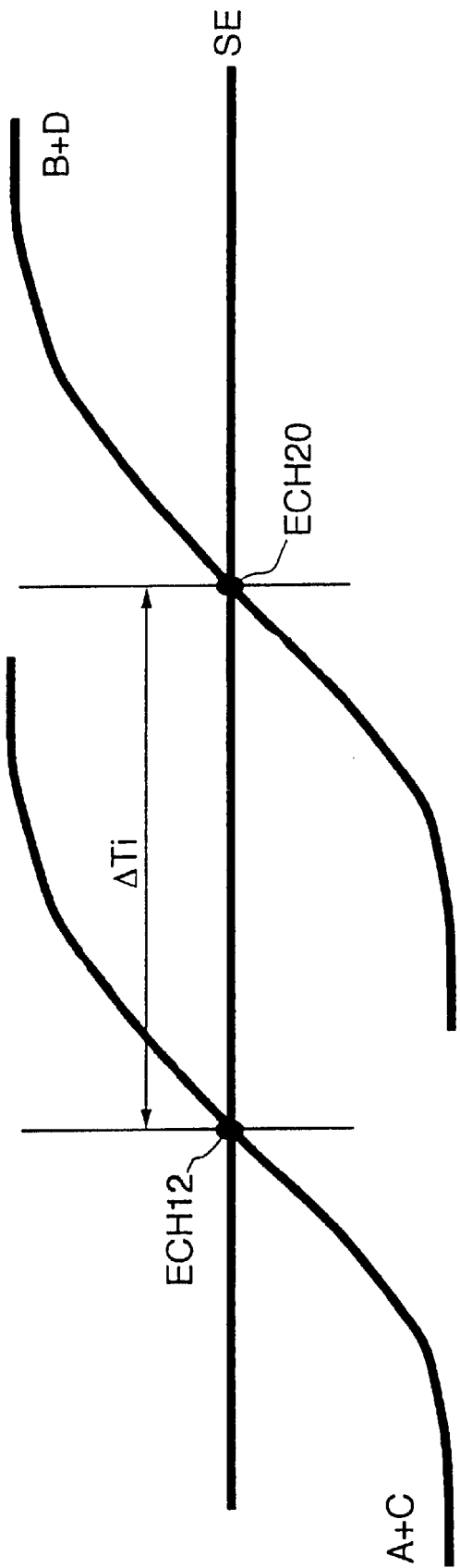
FIG. 4 illustrates the calculation of a value of the temporal phase shift.
Figure 5:
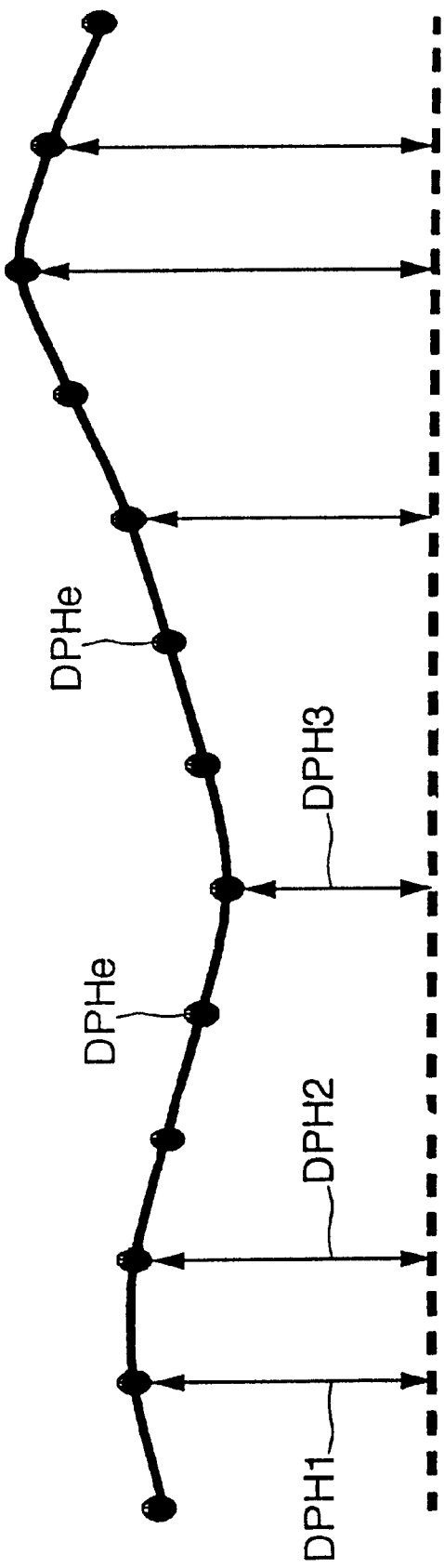
FIG. 5 diagrammatically illustrates another step of the process according to the invention.

Reference is now made more particularly to FIGS. 3 to 6 to describe the manner of operation of the various means according to the invention, as well as an implementation of the process according to the invention. In FIG. 3, the vertical strokes represent the various rising edges of the sampling clock signal, the time gap between two rising edges representing the sampling period Te. In FIG. 3, only the sampled and filtered signal A+C has been represented. The second secondary signal B+D is in fact temporally shifted (phase-shifted) with respect to the signal A+C when the laser beam does not lie on the track of the disc.

In order to determine a value of the mutual phase shift between these two secondary signals A+C and B+D, a transition with respect to a predetermined threshold SE, for example the value 0 (here a transition is a crossing of the threshold), will be determined for each of these two secondary signals. A parameter making it possible to select the samples from which a transition of the secondary signal will be tagged is a predetermined amplitude range ±TH. The amplitude of this range generally depends on the level of noise marring the elementary signals. In practice, an amplitude TH of the range equal to the noise/signal ratio will be chosen. Thus, in practice, if each of the secondary signals A+C and B+D has a normalized amplitude of between −1 and +1, the value TH will be equal to the noise/signal ratio, for example from 3 to 5% of the useful signal corresponding to a noise/signal ratio of from 20 to 30 dB. Stated otherwise, the value TH will for example be taken equal to 0.05.

The manner of operation of the device will now be described in respect of the signal A+C, it being clear that this operation is identical with respect to the signal B+D. A certain number of samples of the secondary signal are permanently stored in a memory, for example a first-in first-out memory (FIFO) whose size determines the number of samples permanently stored. We shall return to this size in greater detail hereinbelow.

The selection means MSL1 will then tag a local extreme of the signal A+C, for example a local minimum ECHm. The tagging of a local minimum or of a local maximum is performed in a conventional manner known per se by observing the sign of the time derivative of the signal at this point. Only a local minimum situated outside the predetermined range, i.e. whose level lies in this instance below the value −TH, is selected. Thereupon, the selection means will search among the subsequently delivered samples of the signal A+C for a local maximum ECHM also lying outside the predetermined range, i.e. whose level is greater than the value +TH.

The time gap ΔT1 between the local minimum ECHm and the local maximum ECHM then defines a selection window inside which will be selected, from among the stored intermediate samples, the two samples ECH1 and ECH2 lying on either side of the threshold SE and in the neighborhood of the latter. In practice, the two samples closest to the threshold SE are chosen.

The interpolation means MIT1 then perform an interpolation, for example a linear interpolation between these two samples ECH1 and ECH2, so as to determine a calculated intermediate sample ECH12 whose level is equal to the threshold and which manifests the transition of the signal A+C. The size of the memory storing the samples is in practice equal to a period of the lowest frequency of the useful frequency spectrum. This makes it possible, if a local minimum ECHm corresponding to the lowest frequency has been tagged, to be able to tag the following local maximum. If, on the other hand, no local maximum situated outside the range is tagged in the selection window, after the local minimum has been tagged, the previously tagged local minimum is then overwritten in the memory and the selection procedure recommences.

It may be seen in FIG. 3 that the samples ECH5 and ECH6 likewise respectively form a local minimum and a local maximum. However, the latter are situated inside the predetermined range. They will therefore be ignored when tagging a transition of the signal A+C to avoid any error due to the presence of noise.

In parallel with the determining of the calculated intermediate sample ECH12, the selection means MSL2 and interpolating means MIT2 determine a calculated counterpart sample ECH20 (FIG. 4) corresponding to a transition of the secondary signal B+D. In this regard, it should be noted that if a local minimum has been tagged first followed by a local maximum for the signal A+C, then the two extreme samples corresponding likewise to the appearance of a minimum followed by a maximum will be selected for the signal B+D.

The interpolation has made it possible to ascertain accurately the duration separating each calculated sample of the rising edge preceding or following this calculated sample. Consequently, the calculation means MC can deduce therefrom the time gap ΔTi separating the two samples ECH12 and ECH20, and consequently separating the two transitions of the secondary signals A+C and B+D. The positioning error TE will then be proportional to this value ΔTi.

The various values ΔTi delivered by the calculation means are thereafter processed in the median filter FM of length three, which has the effect of deleting the extreme values of each trio of values delivered by the calculation means MC. Thus, a median filter of length 3 acts on a sliding window of size 3, on the samples delivered by the calculation means MC and stored in a memory. More precisely, the median filter selects, inside a sliding window of three stored samples, the sample of median level, and delivers it as output. The use of a median filter thus makes it possible to further minimize the phase-shift calculation errors due to the presence of noise. Moreover, the use of a low-pass filter in combination with a "prohibited" range for the samples selected makes it possible to use a median filter of reduced length, in particular of length 3, this being a median filter which is simple to construct.

Figure 6:
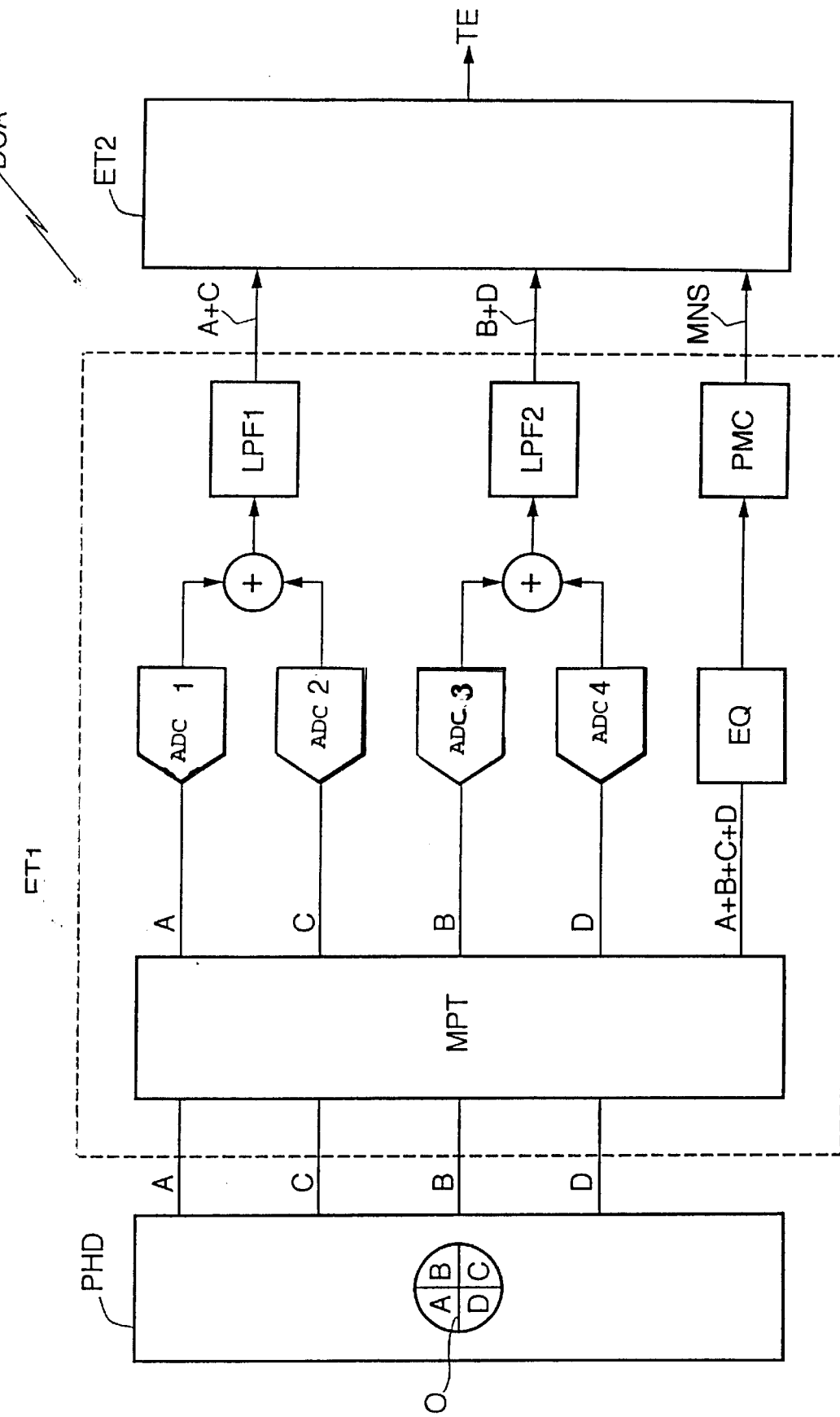
FIGS. 6 to 8 diagrammatically illustrate another embodiment and implementation of the invention.

The successive values, delivered by the median filter FM, of phase shift DPHi between the signals A+C and B+D are delivered to the interpolator filter FPB (FIG. 6). The function of this filter is in particular to calculate by interpolation phase-shift values DPHe interpolated from values actually calculated by the calculation means and filtered by the median filter, when these phase-shift values are not available. Such is the case for example when one of the secondary signals is momentarily unexploitable.

Figure 7:
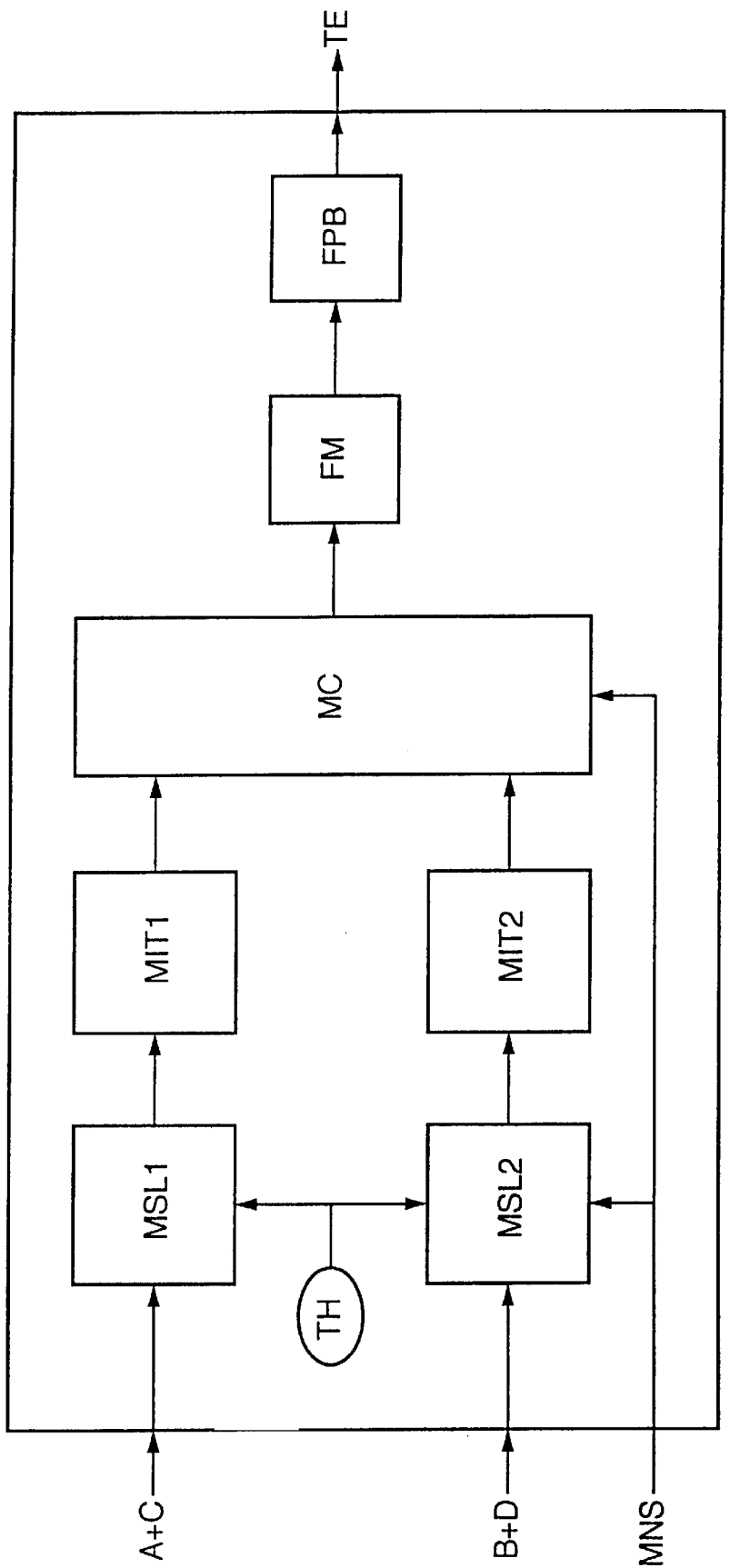
Figure 8:
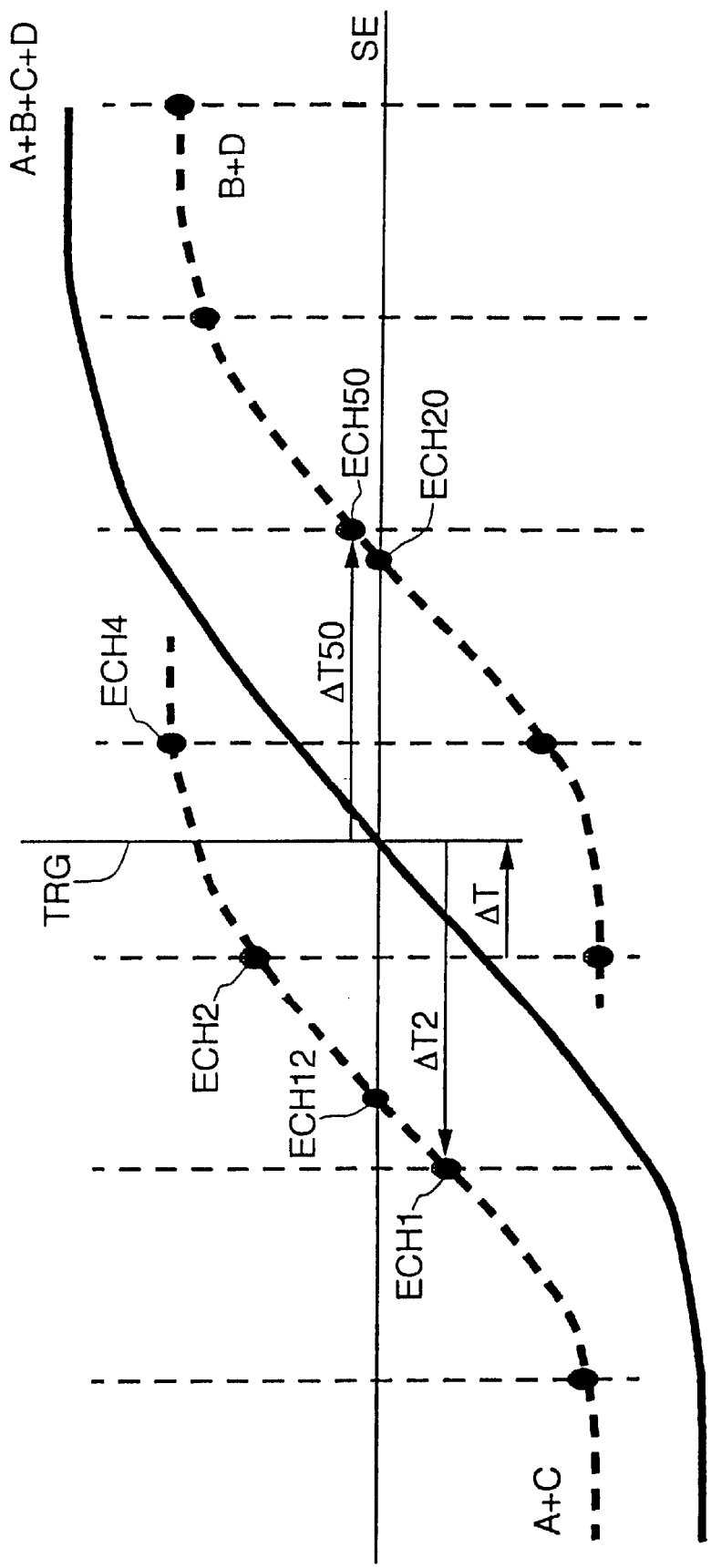

Stated otherwise, this filter FPB makes it possible to deliver, in a regular manner, phase-shift values representative of the error in positioning the beam on the track, and which will make it possible to correct this position and to permanently slave the optical beam to the track of the rotating disc. Hence, reference is more particularly made to FIGS. 6 to 8 to illustrate another embodiment of the invention.

In practice, the preprocessing means MPT also deliver an overall signal or useful signal, equal to the sum of the four elementary signals A, B, C and D. It is from this useful signal that the information contained in the track will in particular be extracted. The sampling clock signal is also used by a digital phase-lock loop PMC, of a known structure. This digital loop PMC receives the equalized overall signal after passing through an equalizer EQ, also of a known structure.

The digital loop PMC also receives the sampling clock signal and formulates an auxiliary sampling signal whose period $T_{PMC}$ is equal to Te/n where Te is the period of the sampling clock signal and n is an integer. The digital loop PMC detects any transition of the overall signal with respect to the predetermined threshold SE and determines the interval of the auxiliary sampling signal within which the transition is situated. More precisely, the digital loop PMC delivers as output a digital word MNS representative of the distance ΔT between any detected transition of the overall signal and the rising edge of the immediately preceding clock signal. In practice, by way of example, if the phase-lock loop typically includes 32 inverters making it possible to subdivide the period Te of the sampling clock signal into 32 intervals (n=32), the digital loop PMC will deliver a word of five bits representing the index of the interval in which the transition is situated. This being the distance between the rising edge of the sampling clock signal and the transition of the signal. Thus, a digital word equal to 00000 will be representative of a transition in phase with the rising edge of the clock signal, while a digital word equal to 11111 will be representative of a transition situated just ahead of the subsequent rising edge of the clock signal.

The overall signal A+B+C+D, and more especially the presence of the transition TRG, thus makes it possible to control and validate the selecting of the intermediate samples situated on either side of the threshold SE (and from which samples the transitions of the secondary signals will be calculated), and consequently to control and validate the selecting of the local extremes. More precisely, if ΔT2 denotes the time gap between the transition TRG of the overall signal and the intermediate sample ECH1 of the signal A+C, and if ΔT50 denotes the time gap between the intermediate sample ECH50 of the signal B+D (from which the intermediate sample ECH20 will be calculated), the selecting of the samples and the calculating of the transitions will be controlled and validated if the values ΔT2 and ΔT50 are substantially equal.

The invention thus makes it possible to do away with the use of analog equalizers on the paths for processing the elementary signals emanating from the photodetectors. It is thus possible to integrate all the components of the directing control device DCA onto one and the same circuit which is capable of adapting very easily to technological advances. Of course, the above-described embodiment of processing means in software fashion may also be effected by logic components in the form of integrated circuits by using conventional automatic logic synthesis software.

That which is claimed:

1. A method of directing an incident optical beam to a track of information on a dynamic medium, wherein the beam reflected by the medium is picked up by an optical pickup including several photodetectors, elementary signals respectively delivered by the photodetectors are used to form two secondary signals, which, in turn, are sampled and filtered by a low-pass filter having a cutoff frequency at most equal to a quarter of a sampling frequency, the mutual phase shift of the two secondary signals being representative of the positioning error of the beam with respect to the track, the method comprising:

selecting, for each secondary signal, at least one pair of samples situated outside a predetermined amplitude range located about a predetermined threshold;

identifying, by interpolation from the selected samples, two transitions respectively for the two secondary signals, with respect to the predetermined threshold and corresponding to one direction of crossing of the threshold;

determining a time gap between the two transitions;

determining a value of the mutual phase shift based upon the time gap; and directing the optical beam based upon the value of the mutual phase shift.

2. A method according to claim 1, wherein the predetermined amplitude range is centered around the predetermined threshold.

3. A method according to claim 1, wherein the secondary signals include noise; and wherein an amplitude of the range in each of a positive and negative direction with respect to the predetermined threshold is at least equal to the product of a maximum amplitude of the secondary signals times a signal/noise ratio.

4. A method according to claim 1, wherein an amplitude of the range in each of a positive and negative direction with respect to the predetermined threshold is less than half a maximum amplitude of the secondary signals.

5. A method according to claim 1, wherein, for each secondary signal, the selected samples comprise a pair of samples situated on each side of the predetermined threshold, outside the predetermined range, and respectively forming a local minimum and a local maximum which follow the secondary signal; and wherein an order of temporal occurrence of the local minimum and of the local maximum is the same for the at least one pair of samples for each secondary signal.

6. A method according to claim 5, wherein identifying comprises:

storing the pair of samples respectively forming the local minimum and the local maximum which follow the secondary signal, and intermediate samples situated between the local minimum and the local maximum;

selecting, from among the intermediate samples, two intermediate samples situated on each side of the predetermined threshold and adjacent the predetermined threshold; and interpolating between the two selected intermediate samples to obtain a calculated sample having a level corresponding to the predetermined threshold.

7. A method according to claim 1, wherein an overall signal containing the information and delivered by the optical pickup is used to control the selecting of the samples.

8. A method of directing an incident optical beam to a track of information on a dynamic medium, the method comprising:

detecting a reflected beam from the dynamic medium with an optical pickup including a plurality of photodetectors;

generating respective elementary signals from each of the photodetectors;

forming two secondary signals from the elementary signals;

sampling and filtering the two secondary signals with a low-pass filter having a predetermined cutoff frequency;

selecting, for each secondary signal, at least one pair of samples situated outside a predetermined amplitude range located about a predetermined threshold;

identifying, by interpolation from the selected samples, a respective transition for each of the two secondary signals, with respect to the predetermined threshold and corresponding to one direction of crossing of the threshold;

determining a time gap between the transitions;

determining a value of a mutual phase shift of the two secondary signals based upon the time gap, the mutual phase shift being representative of the positioning error of the beam with respect to the track; and directing the optical beam in view of the positioning error.

9. A method according to claim 8, wherein the predetermined amplitude range is centered around the predetermined threshold.

10. A method according to claim 8, wherein the predetermined cutoff frequency is at most equal to a quarter of a sampling frequency.

11. A method according to claim 8, wherein the secondary signals include noise; and wherein an amplitude of the range in each of a positive and negative direction with respect to the predetermined threshold is at least equal to the product of a maximum amplitude of the secondary signals times a signal/noise ratio.

12. A method according to claim 8, wherein an amplitude of the range in each of a positive and negative direction with respect to the predetermined threshold is less than half a maximum amplitude of the secondary signals.

13. A method according to claim 8, wherein, for each secondary signal, the selected samples comprise a pair of samples situated on either side of the predetermined threshold, outside the predetermined range, and respectively forming a local minimum and a local maximum; and wherein an order of temporal occurrence of the local minimum and of the local maximum is the same for the at least one pair of samples for each secondary signal.

14. A method according to claim 13, wherein identifying comprises:

storing the pair of samples respectively forming the local minimum and the local maximum, and intermediate samples situated between the local minimum and the local maximum;

selecting, from among the intermediate samples, two intermediate samples situated on each side of the predetermined threshold and adjacent the predetermined threshold; and interpolating between the two selected intermediate samples to obtain a calculated sample having a level corresponding to the predetermined threshold.

15. A method according to claim 8, wherein an overall signal combining each of the elementary signals and delivered by the optical pickup is used to control the selecting of the samples.

16. A device for directing an incident optical beam to a track of information on a dynamic medium, comprising:

an optical pickup for detecting a reflected beam from the dynamic medium, and comprising a plurality of photodetectors for respectively generating elementary signals;

a first processing stage connected to the pickup and comprising a sampling unit and a low-pass filtering unit having a predetermined cutoff frequency, for forming two secondary signals from the elementary signals; and a second processing stage connected to an output of the first processing stage, and comprising a selection unit for selecting, for each secondary signal, at least one pair of samples which are outside a predetermined amplitude range and located about a predetermined threshold, a formulating unit for identifying, by interpolation from the selected samples, a respective transition for each of the two secondary signals, with respect to the predetermined threshold and corresponding to one direction of crossing of the threshold, and a calculation unit for determining a time gap between the transitions, to determine a mutual phase shift of the two secondary signals which is representative of a positioning error of the optical beam with respect to the track.

17. A device according to claim 16, wherein the predetermined cutoff frequency is centered around the predetermined threshold.

18. A device according to claim 16, wherein the predetermined cutoff frequency is at most equal to a quarter of a sampling frequency.

19. A device according to claim 16, wherein the secondary signals include noise; and wherein an amplitude of the range in each of a positive and negative direction with respect to the predetermined threshold is at least equal to the product of a maximum amplitude of the secondary signals times a signal/noise ratio.

20. A device according to claim 16, wherein the second processing stage further comprises a memory for storing the selected samples for each secondary signal; wherein, for each secondary signal, the selected samples comprise a pair of samples situated on each side of the predetermined threshold, outside the predetermined range, and respectively forming a local minimum and a local maximum; wherein an order of temporal occurrence of the local minimum and of the local maximum is the same for the at least one pair of samples for each secondary signal; wherein the formulating unit stores in the memory, for each secondary signal, intermediate samples situated between the local minimum and the local maximum, and selects, from among the intermediate samples, two intermediate samples on each side of the predetermined threshold and adjacent the predetermined threshold; wherein the formulating unit comprises an interpolation unit for interpolating between the two selected intermediate samples of each secondary signal to determine, for each secondary signal, a calculated sample having a level corresponding to the predetermined threshold; and wherein the calculation unit determines the positioning error from the calculated samples.

21. A device according to claim 16, wherein the second processing stage further comprises:

a median filter of length three and connected to an output of the calculation unit; and an interpolator filter connected to an output of the median filter.

* * * * *